Patented May 11, 1937

2,079,788

UNITED STATES PATENT OFFICE 2,079,788

PROCESS AND COMPOSITION FOR PRINTING TEXTILE FIBER

Ivan Fleming Chambers, Wilmington, Del., assignor to E. I. du Pont de Nemours & Company, Wilmington, Del., a corporation of Delaware No Drawing. Application August 10, 1935, Serial No. 35,667

10 Claims. (Cl. 8—6)

This invention relates to an improved process for printing textile fibers with vat dyestuffs, and to dyestuff compositions especially adapted to this process. More particularly it relates to the preparation and application to a fabric composed of either natural or synthetic fibers of a printing composition containing a vat dyestuff and a material adapted to facilitate the printing operation. The invention also relates to the vat color paste and to the fabric imprinted therewith as articles of manufacture.

By the term "vat dyestuff" hereinafter I am referring to dyestuffs of the anthraquinone, indigo, thioindigo and sulfur series which are capable of being reduced by the aid of alkaline hydrosulfite.

The printing of fabric with vat colors is a well known and highly developed art. It generally comprises dispersing the vat color in a thickening paste containing reducing agents, applying to the fabric by means of an engraved roller, then exposing the fabric to the action of steam, which is known as "ageing", to effect reduction of the color, and finally treating with a mild oxidizing agent, and washing and soaping to remove the gum, unfixed color, etc.

Processes are also known which employ stabilized water-soluble forms of the vat dyestuffs, such as the leuco-esters of the vat dyestuff, known as "Indigosol" colors. These colors are water-soluble and require no reducing agent. Application consists in impregnating the fabric with the color and fixing the dyestuff on the fiber by subsequent hydrolysis and oxidation.

In either case, special assistants are generally added to the dyestuff composition or printing paste, to facilitate the dispersion of the dyestuff, penetration, reduction, oxidation, etc. The state of perfection, however, has not yet been attained, and the printer generally has to cope with such problems as poor penetration of the color into the fiber, low tinctorial yield, lack of brilliancy in the prints, specky or mottled prints. He is also quite restricted in the conditions of operation, and will frequently obtain inferior results if the ageing time is curtailed or if the percentage of reducing agent in the printing composition is appreciably reduced. In printing with the water-soluble forms of the vat dyestuffs, the additional problem enters of obtaining deep shades. Light shades are as a rule obtained readily with leuco-esters, but only a few of the latter have sufficient solubility and penetrating power to produce a satisfactory deep shade.

It is an object of this invention to provide a process for printing with vat dyestuffs which is characterized by the production of uniform prints, free from speckiness, and of good penetration. It is a further object of this invention to produce novel dyestuff compositions and/or printing pastes which are particularly adapted for the process aforementioned. It is a still further object of this invention to provide novel vat dyestuff compositions which possess good wetting, penetrating and dispersing power, and permit of efficient utilization of the color. A still further object is to produce prints of exceptional strength, brilliancy, penetration on natural and particularly on lustrous and delustered regenerated cellulose fibers. Another object is to produce dyeings of exceptional levelness, penetration, strength and brilliancy by the pigment-pad method or by continuous or intermittent machine method. Other and further objects of this invention will appear as the description proceeds.

These and other objects of my invention are accomplished, in a general way, by incorporating into the printing paste, directly or by way of first mixing with the dyestuff, a water-soluble sulfate of an alcohol containing not less than 6 and up to 12 carbon atoms per molecule, but in which the radical attached to the sulfate group does not contain a straight chain of more than 6 $CH_2$ groups.

Typical and most available compounds of the above general definition are the mono-sodium-sulfates of the higher alcohols obtained as by-products in the synthetic manufacture of methanol. The latter process generally involves catalytic hydrogenation of mixtures of carbon monoxide and carbon dioxide. But in addition to the main desirable product, methanol, and in addition to other organic compounds of low molecular weight, such as ketones and alcohols below amyl, there is generally obtained a series of by-product branched alcohols, having a total of from 7 to 12 carbon atoms. These alcohols are usually not isolated individually, nor is such individual isolation necessary for the purpose of this invention. Instead, the entire mass of by-products is separated into fractions according to boiling point.

The fractions which I found most useful for the purpose of this invention have, as alcohols, the following boiling ranges and dominant composition. For the sake of facility, I shall herein designate them and later refer to them as fractions A, B, C, and D.

| Fraction | Boiling range | Alcohols dominant in the fraction |
|---|---|---|
| | ° Centigrade | |
| A | 133–150 | Mixture of $C_6$ primary and $C_7$ secondary. |
| B | 150–160 | Mixture of $C_7$ primary and $C_8$ secondary. |
| C | 160–200 | Mixture of $C_8$ to $C_{10}$ both primary and secondary. |
| D | 200–260 | Mixture of $C_{10}$ and above, primary and secondary. |

However, I named these fractions above as the preferred compounds for my invention merely because of their ready availability and cheapness. If available, the individual constituents of the above fractions may be used in pure form. As typical compounds of this series may be mentioned the following individual compounds or mixtures thereof: 4 - methyl - 1 - pentanol; 2 - methyl - 1 - pentanol; 2,4-dimethyl -1- pentanol; 3-methyl-2-pentanol; 2,4 - dimethyl-3-pentanol (di-isopropyl-carbinol); 2 -methyl -3- pentanol; 4-methyl-1-hexanol; 2,4- dimethyl -1- hexanol; 2,5-dimethyl-3-hexanol; and numerous others.

It will be noted that the parent alcohols may be primary or secondary. It will be noted further that they are all characterized by containing no long chains at all, or else containing a long chain loaded with side chains.

I found that best results are obtained with compounds wherein the direct chain between the sulfated alcohol function and the nearest branching point is not longer than 4, or at most 6 carbon atoms.

As for the sulfate group, it may be neutralized by a cation which does not impair the water-solubilizing tendencies of the sulfate function. Such cations are the alkali-metals, for instance sodium or potassium, and water-soluble organic bases especially those which contain free OH groups or other groups conferring water-solubility. Examples of such organic bases are the mono-, di or trialkylamines, mono-, di- or tri-ethanolamine, the corresponding propanolamines, the butanolamines, cyclohexylamine, cyclohexyl-mono or diethanolamine, dimethyl-ethanolamine, n-butylamine, guanidine, tetraethyl-ammonium hydroxide, glucamine, n-methyl-glucamine, diglycerylamine, 1,3-diamino-2-propanol, 1-amino-propane-diol, etc.

My invention does not require the use of the above novel assistants exclusively, but on the contrary other assistants of the customary and well known types may be added, and indeed are often very desirable. These subsidiary assistants may be incorporated into the eventual printing paste in any desirable manner. For instance, they may be mixed with the alkyl-sulfates of this invention to produce an assistant preparation for the convenient use of the printer. Or they may be incorporated by the dyestuff manufacturer jointly with the alkyl-sulfate directly into the dyestuff preparation, to be marketed thus as a color preparation especially suited for printing. Or one of the assistants may be incorporated into the dyestuff while the other is incorporated into the thickening paste or reducing preparation eventually mixed with the dyestuff.

Among these additional or subsidiary assistants may be mentioned wetting and dispersing agents, reducing agents, reducing catalysts, emulsifying agents, lubricants, inert solid or liquid diluents, etc. The individual representatives of these various classes are well known in the art of printing, and it will be sufficient for the purpose of illustration to name here but a few typical members; for instance, sodium benzyl sulfanilate, isopropyl-naphthalene sodium sulfonate, diethylene glycol, sodium oleate, pine oil, glucose, sucrose, dextrine, sodium carbonate, sodium hydrosulfite, formopon, rongalite, hydroxy-alkylamines, tetralin sodium sulfonate, tetralin, hexalin, glycerine, etc. As subsidiary assistants not heretofore commonly employed in this art may be mentioned the free alcohols corresponding to the sulfates of this invention, especially the methanol by-products above mentioned, and the carboxylic acids obtained by the oxidation of these fractions, as more particularly described in U. S. P. No. 1,856,263 and copending application of Hans C. Duus, Ser. No. 735,297.

The sulfuric acid esters or sulfates of the above defined alcohols, forming the major object of this invention, may be prepared in well known manner. A convenient and practically universal method is to react the corresponding alcohol with from 65% to 100% of theory (based on the hydroxyl number) of chlorosulfonic acid, and then neutralizing, with the desired inorganic or organic base. The resulting aqueous solution may be used directly, without troubling to isolate the alkyl-sulfate. The residual free alcohol, where a deficiency of chloro-sulfonic acid is employed, is not a detriment, as has already been indicated.

The concentration of the alkyl-sulfates and their method of application may vary within wide limits, depending on the desired results or convenience. The following general procedures may be used:

(a) Addition of an aqueous solution of the alkyl-sulfate or suitable mixture containing the alkyl sulfate to the printing composition.

(b) Addition of the dry alkyl sulfate or suitable mixture containing the same in powder or flake form to the printing paste.

(c) Addition to the printing composition of the dry alkyl sulfate or suitable mixture in powder or flake form in admixture with sugar, starch or British gum (dextrin).

(d) Preparation of an assistant color paste whereby the vat color pigment or leuco sulfuric ester derivative is intimately mixed with an aqueous solution of the alkyl sulfate.

The proportion of alkyl sulfate with respect to the weight of the printing paste may likewise vary within wide limits, good results being obtained with proportions from 1 to 10%.

Where the alkyl sulfate is incorporated into the marketable dyestuff composition, the latter may be prepared in paste form or dry, for instance, powder, grains or flakes, with suitable diluents such as glucose, sucrose, dextrin, etc., as most convenient.

Without limiting this invention, the following examples are given to illustrate my preferred mode of operation. Parts are by weight.

In these examples, I shall use for the purpose of comparison three types of thickening pastes, to which I shall refer respectively as Thickener A, B, and C, each containing as a common basic ingredient a strach-British-gum paste hereinafter designated as Thickening SBG.

EXAMPLE 1

Illustrating preparation of the thickening pastes.

*Thickening SBG*

100 parts of wheat starch and
300 parts of British gum were pasted with
600 parts of water

___

1000 parts

This mixture was heated at the boil for 10 minutes and cooled to room temperature. A smooth paste was obtained.

*Thickener A*

560 parts of Thickening SBG were heated to 170° F. There was then added 170 parts of potassium carbonate. After the potassium carbonate had dissolved the paste was cooled to 140° F. and the following ingredients added;
120 parts of sodium sulfoxylate formaldehyde
50 parts of glycerine
100 parts of water
———
1000 parts The whole was stirred to form a smooth paste.

*Thickener B*

550 parts of Thickening SBG
50 parts of potassium carbonate
250 parts of caustic soda—35% solution
150 parts of glucose
———
1000 parts

*Thickener C*

520 parts of Thickening SBG were heated to 170° F. There was then added
200 parts of potassium carbonate. The paste was cooled to 140° F. and the following ingredients added
180 parts of sodium sulfoxylate formaldehyde
50 parts of glycerine
50 parts of water
———
1000 parts The whole was agitated to form a smooth paste.

*Examples 2–12.*—Illustrating the preparation of printing pastes and the process of printing.

EXAMPLE 2

20 parts of Sulfanthrene Blue 2BD double paste (Color Index #1184) were mixed with
70 parts of Thickener A. To this was added
10 parts of a 32% solution of the sodium-sulfate of Fraction A (see table above)
———
100 parts The whole was thoroughly mixed to form a smooth paste.

Lustrous and titanium-dioxide delustered rayon piece-goods were printed with the printing composition prepared as described above, dried and aged for 5 minutes at 214° F. in a Rapid ager of the Mather Platt type. The printed material was then treated for 1 minute in an oxidizing bath at 140° F. containing ½% of sodium bichromate and ½% of acetic acid, rinsed in cold water, soaped for 5 minutes in a soap bath at 160° F. containing ½% of soap, rinsed and dried. A brilliant level dyeing was obtained on both types of fabric according to the pattern of the printing roll. The print was very sharp in outline and showed very good penetration to the reverse side of the fabric.

In the above example, the dyestuff may be replaced by any other vat dyestuff of the thioindigo or anthraquinone series, for instance, Ponsol Dark Blue BR paste (C. I. #1099), Ponsol Jade Green paste (C. I. #1101), Sulfanthrene Yellow R paste (C. I. #1170), Sulfanthrene Orange R paste, (C. I. #1217), Sulfanthrene Violet B double paste (C. I. #1222), Ponsol Yellow G double paste (C. I. #1118), Ponsol Golden Orange double paste, (C. I. #1096), Ponsol Blue GD double paste (C. I. #1113), Du Pont Vat Yellow 8G double paste, Ponsol Brown AR double paste (C. I. #1151), and numerous others.

Likewise, instead of the sulfate of Fraction A from the methanol by-products, one may use with equal success the sulfates of Fractions B, C, or D, or of the other equivalent alcohols above mentioned.

Thickener A may be replaced by Thickener C, or any other convenient thickener composition. And in addition to the alkyl sulfate mentioned, there may be added therewith from 1 to 5 parts of an assistant or diluent, such as the free alcohol form of Fractions A, B, C, or D, pine oil, sucrose, tetralin-sodium sulfonate, diethylene glycol, triethanolamine, etc.

EXAMPLE 3

20 parts of Ponsol Jade Green paste (C. I. #1101) were mixed with
75 parts of Thickener C. There was then added
5 parts of the sodium sulfate of Fraction C in powder form.
———
100 parts Piece-goods containing lustrous and delustered rayon fibers were printed and treated according to Example 2.

A uniform green dyeing was obtained showing exceptional penetration into the fiber.

EXAMPLE 4

15 parts of Sulfanthrene Orange R paste (C. I. #1217) were mixed with
70 parts of Thickener A as prepared in Example 1. To this was added
12 parts of a 25% paste of the mono-sodium sulfate of Fraction C and
3 parts of sodium hydrosulfite
———
100 parts The whole was stirred to form a smooth paste, heated to 150° F. in order to partially reduce the color and cooled to room temperature.

Piece-goods containing cotton and viscose rayon fibers were printed with the above printing composition. The material was aged, oxidized, and soaped according to the procedure described in Example 2. A brilliant orange dyeing was obtained which showed exceptional penetration of color to the reverse side of the fabric.

EXAMPLE 5

A printing composition was prepared as follows:
15 parts of Sulfanthrene Pink FF paste (C. I. #1211) were mixed with
47 parts of Thickening SBG. To this was added
7 parts of potash
5 parts of caustic soda—35% solution
5 parts of glycerine
10 parts of 35% solution of the sodium-sulfate of Fraction A, and
4 parts of sodium hydrosulphite
The composition was heated to 180° F., cooled to 140° F. and
7 parts of sodium sulfoxylate formaldehyde added
———
100 parts The whole was then stirred until a smooth paste was obtained and allowed to cool to room temperature.

Piece-goods containing cotton, cuprammonium rayon, and cellulose acetate fibers were printed with the above printing composition, dried, aged, oxidized, soaped, and finished according to the procedure described in Example 2. A brilliant red print was obtained which was very sharp in outline and which showed exceptional penetration to the reverse side of the fabric.

EXAMPLE 6

10 parts of Sulfanthrene Brown G paste (or Ciba Brown G paste) were mixed with
42 parts of Thickening SBG. To this was added
5 parts of glycerine
8 parts of caustic soda—35% solution
10 parts of potash
15 parts of a 50% paste of sodium-sulfate of Fraction D, and
10 parts of glucose
———
100 parts Cotton and rayon piece-goods were printed with the above printing composition, dried, aged, oxidized, soaped, and finished according to the procedure described in Example 2. A brilliant brown dyeing was obtained which showed excellent color value and penetration into the fiber.

EXAMPLE 7

5 parts of Sulfogene Fast Black CL (Indocarbon CL) were mixed with
5 parts of glycerine and
15 parts of a 35% solution of the sodium-sulfate of Fraction B. To this was added
75 parts of Thickener B
———
100 parts The whole was stirred to form a smooth paste. Cotton and viscose rayon piece-goods were printed with the above printing composition, dried, aged, oxidized and finished according to the procedure described in Example 2. A brilliant black dyeing of exceptional color value and penetration was obtained.

In any of the above examples, the mono-sodium salt of Fraction A, B, C, or D may be replaced by other water-soluble salts, as already mentioned above. The procedure is otherwise substantially the same.

EXAMPLE 8

20 parts of Ponsol Dark Blue BR paste (C. I. #1099) were mixed with
70 parts of Thickener C. To this was added
10 parts of the triethanolamine salt of the sulfuric acid ester of Fraction B
———
100 parts Piece-goods containing lustrous rayon, barium sulfate delustered rayon, and silk fibers were printed, dried and aged at 230° F. with dry steam. The printed material was then oxidized, soaped and finished according to the procedure described in Example 2. Although aged at an excessively high ageing temperature with dry instead of moist steam, a brilliant level dyeing fast to light and laundering agencies was obtained.

Further assistants may be mixed with the alcohol-sulfate, if desired, as mentioned under Example 2. 5 parts of triethanolamine makes a particularly useful addition in this example.

EXAMPLE 9

10 parts of Ponsol Flavone GC double paste (C. I. #1095) were mixed with
20 parts of a 25% solution of the sodium-sulfate of Fraction A.
To this was added
70 parts of Thickener C
———
100 parts Piece-goods containing cotton, lustrous viscose rayon and ethylene-glycol-di-beta-naphthylether delustered viscose rayon were printed, dried, and aged for 2 minutes at 216° F. in a Mather Platt continuous ager. The printed material was oxidized, soaped and finished according to the procedure described in Example 2. Although aged for 2 minutes instead of 5 minutes as is the usual practice, a uniform dyeing was obtained which showed excellent color value and very good penetration.

EXAMPLE 10

10 parts of Ponsol Yellow G double paste (C. I. #1118) were mixed with
70 parts of Thickener A. To this was added
20 parts of a solution containing
{ 2 parts HTP sulfate B-25
2 parts Tetralin sodium sulfonate
16 parts water
———
20 parts }
———
100 parts Lustrous and titanium dioxide delustered rayon piece-goods were printed with the above printing paste, dried, aged, and finished as in Example 1. A brilliant sharply outlined print free from specks or mottled effects was obtained.

The above process may be applied to any of the colors mentioned in Example 1. And in lieu of tetralin sodium sulfate, one may add from 1 to 5 parts of any other of the customary assistants for printing, for instance, glycerine, sodium benzyl sulfanilate, diethylene glycol, sucrose, triethanolamine, or the free alcohol form of one of the Fractions A, B, C, and D.

EXAMPLE 11

16 parts of Ponsol Brilliant Violet 4RN paste were mixed with
70 parts of Thickener C; To this was added
12 parts of a 35% solution of the sodium-sulfate of Fraction A and
2 parts of sodium benzyl sulphanilate
———
100 parts Lustrous and barium sulphate delustered rayon yarn was printed with the above printing composition, dried, aged for 5 minutes at 216° F. in a Cottage steamer, oxidized, and finished as in Example 1. A brilliant uniform violet dyeing was obtained.

EXAMPLE 12

10 parts of Ponsol Jade Green double paste (C. I. #1101) were mixed with
70 parts of Thickener C; To this was added
20 parts of an emulsion consisting of
{ 4 parts of Fraction C-sodium-sulfate
1 part of hexalin
1 part of Tetralin
14 parts of water
———
20 parts }
———
100 parts Lustrous and titanium dioxide delustered rayon piece-goods were printed with the above printing composition, dried, aged and finished as in Example 2. A brilliant, level green dyeing of exceptional penetration was obtained.

*Examples 13–15.*—Illustrating the application of this invention to printing with leuco esters of vat dyestuffs.

EXAMPLE 13

3 parts of Indigosol O4B (leuco sulfuric acid ester derived from Ciba Blue 2BD) (C. I. #1184)
3 parts of glycerine—Pasted together and added
15 parts of warm water (140° F; Then mixed with
60 parts of neutral starch tragacanth thickening after which the following ingredients were added
3 parts of urea
3 parts of ammonium thiocyanate (50% solution)
3 parts of sodium bichromate (50% solution)
10 parts of a 25% solution of the sodium sulfate of Fraction B (see table above)

100 parts

The whole was then thoroughly mixed to form a smooth paste.

Cotton piece-goods were printed with the above printing composition, dried, exposed for 3 minutes to the acid fumes obtained by boiling a solution containing 2% of acetic acid, rinsed, soaped for 5 minutes at 180° F., rinsed and dried. An exceptionally strong level blue dyeing was obtained.

EXAMPLE 14

6 parts of Ponsol Jade Green soluble (leuco sulfuric ester derived from Ponsol Jade Green) (C. I. #1101) were mixed with
3 parts of glycerine
17 parts of warm water (160° F.) and
60 parts of neutral starch-tragacanth thickening; There was then added
6 parts of sodium chromate—33% solution and
8 parts of a 50% paste of Fraction C-sodium-sulfate 100 parts The whole was then well mixed to form a smooth paste.

Cotton piece-goods were printed with the above printing paste, dried, and exposed for 3 minutes to the acid fumes obtained by boiling a solution containing 2% of acetic acid and 1% of formic acid. The printed material was rinsed, soaped for 5 minutes at the boil in a ½% soap solution, again rinsed and dried. A brilliant, level green dyeing was obtained showing excellent color value and unusual penetration to the reverse side of the fabric.

EXAMPLE 15

5 parts of Indigosol Golden Yellow IGK (leuco sulfuric ester derived from Indanthrene Golden Yellow GK) were mixed with
5 parts of glycerine
20 parts of warm water (160° F.) and
50 parts of neutral starch tragacanth thickening; There was then added
20 parts of a 25% solution of Fraction-D-sodium sulfate.

100 parts

The whole was then well mixed to produce a smooth paste.

Cotton piece-goods were printed with the above printing composition, dried, and the color developed by a passage through the following bath at 95° F., the time of contact being 2 seconds.

30 parts of sodium bichromate
74 parts of sulfuric acid (168° Tw.)
896 parts of water 1000 parts After passing through the above bath, the material was passed through squeeze rolls, exposed to the air for 40 seconds, rinsed, soaped for 5 minutes at the boil in a ½% soap solution, rinsed and dried. A brilliant uniform yellow dyeing was obtained showing exceptional penetration of color to the reverse side of the fabric.

*Examples 16–23.*—Illustrating the preparation of novel dyestuff compositions especially adapted for this invention.

EXAMPLE 16

100 parts of Sulfanthrene Blue 2BD double paste (C. I. #1184) were mixed with
50 parts of a 30% solution of mono-sodium sulfate of Fraction A 150 parts total. There was then evaporated
50 parts water producing 100 parts of Assistant Sulfanthrene Blue 2BD double paste, in a form adapted for handling in commerce and transport.

EXAMPLE 17

50 parts of Sulfanthrene Orange R (C. I. #1217) press cake containing 24% color solids were mixed with
100 parts of a 25% solution of mono-sodium sulfate of Fraction B and
1 part of silver salt 151 parts. There was then evaporated
51 parts water producing 100 parts Assistant Sulfanthrene Orange R paste.

The above was milled in a colloid mill producing a finely dispersed assistant dyestuff paste adapted for handling in commerce.

EXAMPLE 18

14 parts of Ponsol Blue GD (C. I. #1113) dry press cake were mixed with
86 parts of 35% solution of mono-sodium sulfate of Fraction B 100 parts The above mixture was milled for 3 hours in a rod mill. A finely dispersed assistant dyestuff paste was obtained. It was observed that if a small quantity of the assistant paste was allowed to dry, the resulting lumps of color immediately dissolved and the pigment was redispersed when added to the assistant paste mixture.

In a manner similar to the last three examples, other marketable dyestuff compositions, or "assistant dyestuff paste", may be prepared, possessing excellent dispersing and penetrating powers. For instance, any of the dyestuffs listed under Example 2 may be employed. And in addition to the special alkyl sulfates of this invention, one may add other customary assistants, such as glycerine, diethylene glycol, triethanolamine, the free alcohol form of Fractions A, B, C, and D, or water-soluble salts of the carboxylic acids obtained by the oxidation of these alcohol fractions.

As in the case of the printing pastes, the sodium sulfate of the alcohol in these examples may be replaced by the sulfates of other fractions of the class indicated or by other water-soluble forms of the sulfate.

EXAMPLE 19

50 parts of Sulfanthrene Pink FF (C. I. #1211) press cake containing 26% color solids were mixed with
1 part of Leukanol—30% solution
1 part of ferric sulfate and
48 parts of a 30% solution of sodium sulfate of Fraction D 100 parts The above mixture was milled in a colloid mill producing a smooth homogeneous paste.

EXAMPLE 20

100 parts of Ponsol Dark Blue BR paste (C. I. #1099) were mixed with
50 parts of the triethanolamine salt of Fraction C-sodium sulfate 150 parts total; There was then evaporated
50 parts of water producing 100 parts of a finely dispersed assistant dyestuff paste.

EXAMPLE 21

100 parts of Ponsol Blue BCS double paste (C. I. #1114) were mixed with
30 parts of triethanolamine and
30 parts of the triethanolamine salt of the sulfuric acid ester of Fraction D 160 parts total; There was then evaporated
60 parts of water producing 100 parts of Assistant Ponsol Blue BCS double paste.

EXAMPLE 22

100 parts of Ponsol Jade Green Soluble paste, leuco sulfuric ester of Ponsol Jade Green (C. I. #1101) were mixed with
25 parts of a 30% solution of Fraction B-sodium sulfate 125 parts total; There was then evaporated
25 parts of water forming 100 parts of Assistant Ponsol Jade Green soluble.

EXAMPLE 23

Illustrating the preparation of the alkyl sulfates employed in this invention.

To 100 parts of methanol synthesis by-product Fraction B, having a hydroxyl number of 7.5, are slowly added over a period of 2¾ hours, 64 parts of chlorsulfonic acid. The temperature is maintained at 35–40° C. throughout the addition of the chlorsulfonic acid. Agitation is continued for further 45 minutes at the same temperature and the reaction product is carefully poured into 180 parts of caustic soda solution (18.8%), not allowing the temperature to rise over 50° C.

Approximately 324 parts of solution are obtained containing 21.5% of the alkyl sulfate, mostly $C_7H_{15}OSO_3Na$, primary and $C_8H_{17}OSO_3Na$, secondary, and may be used directly for the purposes of this invention. Alternatively, the alkyl sulfate may be isolated in flake form by evaporating the solution to dryness as for example on a drum drier. The flakes may be employed as such or ground to a fine white powder. The product is stable and very easily redissolved in water.

In a similar manner, the other fractions above tabulated or the various branched chain primary and secondary alcohols enumerated in the introductory pages of this specification may be sulfated. The quantity of chloro-sulfonic acid employed may vary considerably, for instance from 65% to 100% of the theoretical quantity calculated from the hydroxyl number of the given fraction. Other salts than the sodium, for instance the triethanolamine may be prepared by drowning the sulfated mass in an aqueous solution of the corresponding base instead of aqueous caustic soda. The quantity of basic solution should for best results be so chosen that the drowned mass is alkaline throughout the procedure.

It will be understood that while I have described the application of my novel assistants and dyestuff compositions with main emphasis upon printing, the same are also applicable with great success to the dyeing of fabric by the pigment-pad method. In this method of dyeing the dyestuff is not dissolved in the dyeing bath by the customary "vatting", but is applied instead in solid form from a fine aqueous dispersion thereof, the reduction and development being effected subsequently on the fiber. If this operation is carried out by the aid of my novel dyestuff compositions above described, or if the sulfates of the alcohol fractions above described are added to the dye bath, the ultimate dyeings upon development possess increased brilliance, levelness, penetration and strength.

It will be further understood that while I have described my invention above at great length, the examples given are merely illustrative, and many variations and modifications in procedure or composition may be made without departing from the spirit of this invention.

I am aware of French Patent No. 773,718, and the suggestion made therein for using sulfates of lower alcohols, such as ethyl, isopropyl, butyl and isoamyl, for a purpose somewhat analogous to this invention. I found, however, that the sulfates of the alcohols obtainable in the catalytic methanol synthesis and containing from 6 to 12 carbon atoms per molecule are immensely superior to the sulfates of the lower alcohols above mentioned. Moreover, because of the ready availability of these higher alcohols as by-products of an established commercial process, my invention opens up a new field for the improvement of textile printing in an economical manner. Since it was definitely intimated in the said French patent that esters of alcohols of more than 5 carbon atoms are to be avoided as inferior, my discovery and improvement above noted is of a particularly unexpected and surprising nature.

I claim:

1. The process of printing textile fabric with vat dyestuffs which comprises applying thereto a printing composition containing in addition to the dyeing ingredients a water-soluble sulfate of an alcohol containing a total of not less than 6 and not more than 12 carbon atoms, the carbon atoms being so arranged that the radical next to the sulfate group does not form a straight chain of more than 6 $CH_2$ groups.

2. The process of printing textile fabric with vat dyestuffs which comprises applying thereto a printing composition containing in addition to the dyeing ingredients a water-soluble sulfate of an alcohol fraction obtained by distilling the by-products of synthetic methanol manufacture, and having a boiling range within the limits 133 to 260° C.

3. The process of printing textile fabric with vat dyestuffs which comprises applying thereto a printing composition containing in addition to the dyeing ingredients a compound of the general formula $A_1$—$OSO_3M$, wherein A represents the radical of an alcohol occurring as a by-product in the synthetic manufacture of methanol, and having a boiling point between 133 and 260° C., while M stands for an alkali-metal.

4. The process of printing textile fabric with vat dyestuffs which comprises applying thereto a printing composition containing in addition to the dyeing ingredients a compound of the general formula $A_1$—$OSO_3M$, wherein A represents the radical of an alcohol occurring as a by-product in the synthetic manufacture of methanol, and having a boiling point between 133 and 260° C., while M stands for a tri-alkanol ammonium radical.

5. A process as in claim 1, the dyeing ingredients comprising a vat dyestuff in unreduced form and a reducing agent.

6. A process as in claim 1, the dyeing ingredient consisting of the water-soluble leuco-ester of a vat dyestuff.

7. A vat dyestuff composition especially adapted for printing textile fabric of cellulosic origin, comprising a vat dyestuff and a water-soluble sulfate of an alcohol containing a total of not less than 6 and not more than 12 carbon atoms, the carbon atoms being so arranged that the radical next to the sulfate group does not form a straight chain of more than 6 $CH_2$ groups.

8. A dyestuff composition comprising a vat dyestuff and a compound of the general formula $A_1$—$OSO_3M$, wherein A represents the radical of an alcohol occurring as a by-product in the synthetic manufacture of methanol, and having a boiling point between 133 and 260° C., while M stands for an alkali-metal.

9. A dyestuff composition comprising a vat dyestuff and a compound of the general formula $A_1$—$OSO_3M$, wherein A represents the radical of an alcohol occurring as a by-product in the synthetic manufacture of methanol, and having a boiling point between 133 and 260° C., while M stands for a tri-alkanol ammonium radical.

10. A dyestuff composition as defined in claim 7, the dyestuff being in the form of its stable water-soluble leuco-ester.

IVAN FLEMING CHAMBERS.